US012497206B2

(12) United States Patent
Ruddy

(10) Patent No.: US 12,497,206 B2
(45) Date of Patent: Dec. 16, 2025

(54) SEAWEED PROCESSING PLANT

(71) Applicant: Redrose Developments Ltd., Belmullet (IE)

(72) Inventor: Ann Ruddy, Belmullet (IE)

(73) Assignee: Redrose Developments Ltd., Belmullet (IE)

( * ) Notice: Subject to any disclaimer, the term of this patent is extended or adjusted under 35 U.S.C. 154(b) by 5 days.

(21) Appl. No.: 18/574,216

(22) PCT Filed: Jun. 24, 2022

(86) PCT No.: PCT/IB2022/000357
§ 371 (c)(1),
(2) Date: Dec. 26, 2023

(87) PCT Pub. No.: WO2022/269355
PCT Pub. Date: Dec. 29, 2022

(65) Prior Publication Data
US 2024/0308710 A1    Sep. 19, 2024

(30) Foreign Application Priority Data

Jun. 25, 2021 (GB) ...................... 2109189

(51) Int. Cl.
*B65B 65/00* (2006.01)
*A23N 12/06* (2006.01)
(Continued)

(52) U.S. Cl.
CPC ............ *B65B 65/003* (2013.01); *A23N 12/06* (2013.01); *A23N 15/00* (2013.01); *A23N 17/00* (2013.01); *B65B 25/001* (2013.01); *B65B 57/00* (2013.01)

(58) Field of Classification Search
CPC ....... B65B 65/003; B65B 25/001; B65B 7/00; A23N 12/06; A23N 15/00; A23N 17/00;
(Continued)

(56) References Cited

FOREIGN PATENT DOCUMENTS

| CN | 100384881 C | 4/2008 | |
|---|---|---|---|
| CN | 105595375 A | * 5/2016 | ............. A23N 12/06 |

(Continued)

OTHER PUBLICATIONS

Machine Translation of CN-105595375-A (Year: 2025).*
(Continued)

*Primary Examiner* — Veronica Martin
(74) *Attorney, Agent, or Firm* — Barclay Damon LLP

(57) ABSTRACT

This invention relates to a seaweed processing plant, more specifically a portable seaweed processing plant. The portable seaweed processing plant comprises a shipping container having a substantially rectangular cuboid shaped body with at least one releasably securable door to provide access to and from the interior of the container. The container is configured for transport on an articulated chassis. The shipping container houses a remotely monitored seaweed processing line including a seaweed washing station, a seaweed preprocessing station, a seaweed separation station to separate the seaweed into liquid seaweed and solid seaweed, and a seaweed packing station to pack the liquid seaweed and the solid seaweed for onward transport. In this way, the yield from the harvest is optimized, additional products are harvested, and the quality of the harvest is superior than would otherwise be the case.

20 Claims, 4 Drawing Sheets

(51) Int. Cl.
*A23N 15/00* (2006.01)
*A23N 17/00* (2006.01)
*B65B 25/00* (2006.01)
*B65B 57/00* (2006.01)

(58) Field of Classification Search
CPC ....... A01D 44/00; A01G 33/00; A23L 33/105; A23L 33/125; A23L 33/185; A23K 50/75; A23K 50/30; A23K 20/163; A23K 20/147; A23K 10/30
See application file for complete search history.

(56) References Cited

FOREIGN PATENT DOCUMENTS

| | | |
|---|---|---|
| CN | 112806581 A | 5/2021 |
| CN | 112806583 A | 5/2021 |
| KR | 20190142127 A | 12/2019 |
| WO | 2010059801 A2 | 5/2010 |
| WO | 2017222373 A1 | 12/2017 |

OTHER PUBLICATIONS

International Search Report in Application No. PCT/IB2022/000357 dated Oct. 24, 2022, 2 pages.
International Preliminary Report on Patentability in Application No. PCT/IB2022/000357 dated Dec. 14, 2023, 6 pages.

\* cited by examiner

SEAWEED PROCESSING PLANT

CROSS-REFERENCE TO RELATED APPLICATIONS

This application is a 371 national phase entry of Patent Cooperation Treaty Application PCT/IB2022/000357, filed Jun. 24, 2022, which in turn claims priority from UK Patent Application No. GB2109189.7, filed Jun. 25, 2021. Each of the above-described applications is hereby incorporated herein by reference in their entirety.

TECHNICAL FIELD

This invention relates to a seaweed processing plant.

BACKGROUND ART

The efficient and effective processing of seaweed can be surprisingly problematic. Although the material itself is relatively straightforward to handle and manipulate, and does not pose many challenges in that regard, there is a problem in that as soon as the seaweed is harvested, it rapidly begins to biodegrade and lose many of its beneficial nutritional and microbial properties. This is problematic for any raw material, but for a commodity that is already relatively low in value like seaweed, this is highly disadvantageous and can render the crop economically unviable to harvest unless at significant and unsustainable scale. Accordingly, it is desirable to process the seaweed as soon as possible after harvesting so that it remains healthy and retains as much of the microbial activity and the micronutrients as possible, resulting in a higher and more valuable yield from the crop.

In addition to the foregoing, many of the traditional processing techniques are in fact inherently unconducive to maximizing the yield from the harvested crop. For example, it is common practice to transport produce for drying or freezing to stabilize the produce at centrally located processing plants. However, a significant proportion of the beneficial components of seaweed are contained in the moisture that is an inherit part of the composition of the aquatic plant. For example, seaweed liquid is understood to be high in alginates and glutamates, which have numerous beneficial properties including, but not limited to, the nutritional properties of the seaweed as well as improving the organoleptic properties of the seaweed. The liquid coating and liquid content of the seaweed are also high in vitamin and mineral content. By drying the seaweed out, these components are effectively being discarded willingly, and the yield of the harvest is actively reduced. It is thought that by harvesting the liquid from the seaweed, as well as increasing the yield from the harvest, a higher value product with applications in higher value industries will be achieved.

It is an object of the present invention to provide a seaweed processing plant that overcomes at least some of the above-identified problems, that is efficient and relatively inexpensive to implement, and that offers a useful alternative choice to the consumer.

SUMMARY OF THE INVENTION

According to the invention there is provided a portable seaweed processing plant comprising a shipping container having a substantially rectangular cuboid shaped body with at least one releasably securable door to provide access to and from the interior of the container, the container being configured for transport on an articulated chassis; the shipping container having housed therein a seaweed processing line including: a seaweed washing station; a seaweed pre-processing station; a seaweed separation station to separate the seaweed into liquid seaweed and solid seaweed; and a seaweed packing station to pack the liquid seaweed and the solid seaweed for onward transport.

By having such a processing plant, the processing plant may be brought to a location where the harvest is landed, and the seaweed may be processed within a matter of minutes of being brought ashore. In this way, the seaweed will not have sufficient time to dry out and it will be possible to capture a greater percentage of the microbial and micronutrient content of the seaweed. It has been estimated that of the order of 70% of the previously lost biomass can be saved, resulting in a significantly higher yield and greater revenue from the crop being achievable. As a result, the crop will be made financially viable to harvest on a smaller more environmentally friendly scale, however through replication we aim to reach large scale production. In addition, by having the processing plant in a container, the processing plant will be portable and can be shipped from one location to another. This obviates the need for planning permission for the structure and also allows for the farming of the seaweed from multiple remote locations, avoiding the pitfalls, such as environmental damage, of over-harvesting in a particular area.

In one embodiment of the invention there is provided a portable seaweed processing plant in which there is provided a water tank housed in the container for use by the seaweed washing station. By having a water tank, the processing plant will be self-sufficient and will be able to wash the seaweed before it is processed without need for a water supply.

In one embodiment of the invention there is provided a portable seaweed processing plant in which there is provided a filtration system intermediate the water tank and the seaweed washing station for filtration of the water used in the seaweed washing station. It is envisaged that the water used in the washing station may be recycled and used multiple times. By having a filtration system, any detritus or pathogens can be removed from the water supply and a relatively clean water supply can be provided to wash the seaweed.

In one embodiment of the invention there is provided a portable seaweed processing plant in which the seaweed washing station comprises one or more of: (i) an immersion bath; (ii) at least one spray nozzle; (iii) a sprinkler; (iv) a hand-operated hose; (v) a conveyor; and (vi) a centrifuge.

In one embodiment of the invention there is provided a portable seaweed processing plant in which the seaweed pre-processing station comprises one or more of: (i) a sonication device; (ii) a bead beater; (iii) a cavitation unit; and (iv) an autoclave. By pre-processing the seaweed in this way, the cellular structure of the various species of seaweed can be broken down and the nutrients can be released into the liquid. The choice of pre-processing technique (or techniques, as multiple disparate stages may be provided to obtain the desired result of breaking down the cell structure) may depend in part on the species of seaweed that is being processed, as well as seasonality and age of plant.

In one embodiment of the invention there is provided a portable seaweed processing plant in which the seaweed separation station comprises a vat having one or more of: (i) a mixer; (ii) a heat source; and (iii) a chopper. This is seen as a useful way to separate out the solid from the liquid.

Preferably, the temperature will be kept below 36° C. throughout to prevent loss of nutrients.

In one embodiment of the invention there is provided a portable seaweed processing plant in which the processing plant comprises a drying station for drying the solid seaweed. Once the solid seaweed and the liquid seaweed have been separated, it may be preferable to dry the solid seaweed prior to shipping as it will be lighter and easier to transport. Indeed, this may be the preferred manner in which the customer or further processor wishes to receive the dry seaweed.

In one embodiment of the invention there is provided a portable seaweed processing plant in which the drying station is located downstream of the seaweed separation station and upstream of the seaweed packing station. In this way, the solid seaweed will be dried before it is packaged for onwards transit. This will allow the seaweed to be packaged in a more compact manner.

In one embodiment of the invention there is provided a portable seaweed processing plant in which the container is provided with a conveyor intermediate each of the stations.

In one embodiment of the invention there is provided a portable seaweed processing plant in which the container is provided with a dedicated power supply. Again, this will provide a self-sufficient processing plant that will be able to be located practically anywhere to perform the processing tasks.

In one embodiment of the invention there is provided a portable seaweed processing plant in which the dedicated power supply is powered by a renewable energy source.

In one embodiment of the invention there is provided a portable seaweed processing plant in which the dedicated power supply comprises a generator.

In one embodiment of the invention there is provided a portable seaweed processing plant in which the container is provided with a temperature control unit. A temperature control unit is seen as preferable as this will ensure that the temperature inside the container processing plant will be conducive to getting the best possible yield from the crop, without damaging the nutritional properties of the crop. It will also allow the container to work throughout the year, and in a number of different climates.

In one embodiment of the invention the process components of the system would be remotely monitored for quality assurance, volume measurement and maintenance purposes. In order to provide this feature, there will be provided one or more sensors measuring one or more of seaweed conditions, process parameters and/or environmental conditions in the shipping container. In addition, it is envisaged that the system may further include a communication module for communicating with a remote monitoring station. Instead of or in addition to providing a communication module for communicating with a remote monitoring station, the apparatus may comprise a memory for storage of the process parameters and the data may be accessed periodically when processed product is being collected from the processing plant. In this way, it is possible to carry out remote monitoring of the processing systems to assess volume of stock, quality assurance and machine maintenance.

In one embodiment of the invention there is provided a portable seaweed processing plant in which the temperature control unit comprises a thermostat and the temperature control unit is operable to maintain the temperature inside the container at or below 36° C. This will ensure that the nutritional properties of the seaweed are not adversely impacted.

In one embodiment of the invention there is provided a portable seaweed processing plant in which the container is provided with a releasably securable door at either end of the body. In this way, raw material may enter one end of the container and the processed products may be removed through the other end of the container. This will also distance and provide isolation between the processed and unprocessed materials.

In one embodiment of the invention there is provided a portable seaweed processing plant in which the container is provided with a plurality of tracks and in which one or more of the stations is slidably mounted on the tracks for reciprocal movement along the track. This is seen as a useful addition to the present invention. By having one or more stations on tracks, this will allow the station or stations to be slid out of the container on the tracks, so that it still forms part of the processing line but it will provide greater distance between stations. This will allow more time and higher throughput in the processing plant, at least initially.

In one embodiment of the invention there is provided a portable seaweed processing plant in which at least one of the tracks is extensible and may be extended outwardly from the container through an open releasably securable door.

In one embodiment of the invention there is provided a portable seaweed processing plant in which the seaweed separation station comprises a press. A press is seen as a useful way in which the seaweed may be dried and the liquid seaweed extracted from the remainder of the seaweed. In addition, a press is a relatively inexpensive and simple article to operate.

BRIEF DESCRIPTION OF THE DRAWINGS

The invention will now be more clearly understood from the following description of some embodiments thereof given by way of example only with reference to the accompanying drawings, in which.

DETAILED DESCRIPTION

Figure 1:
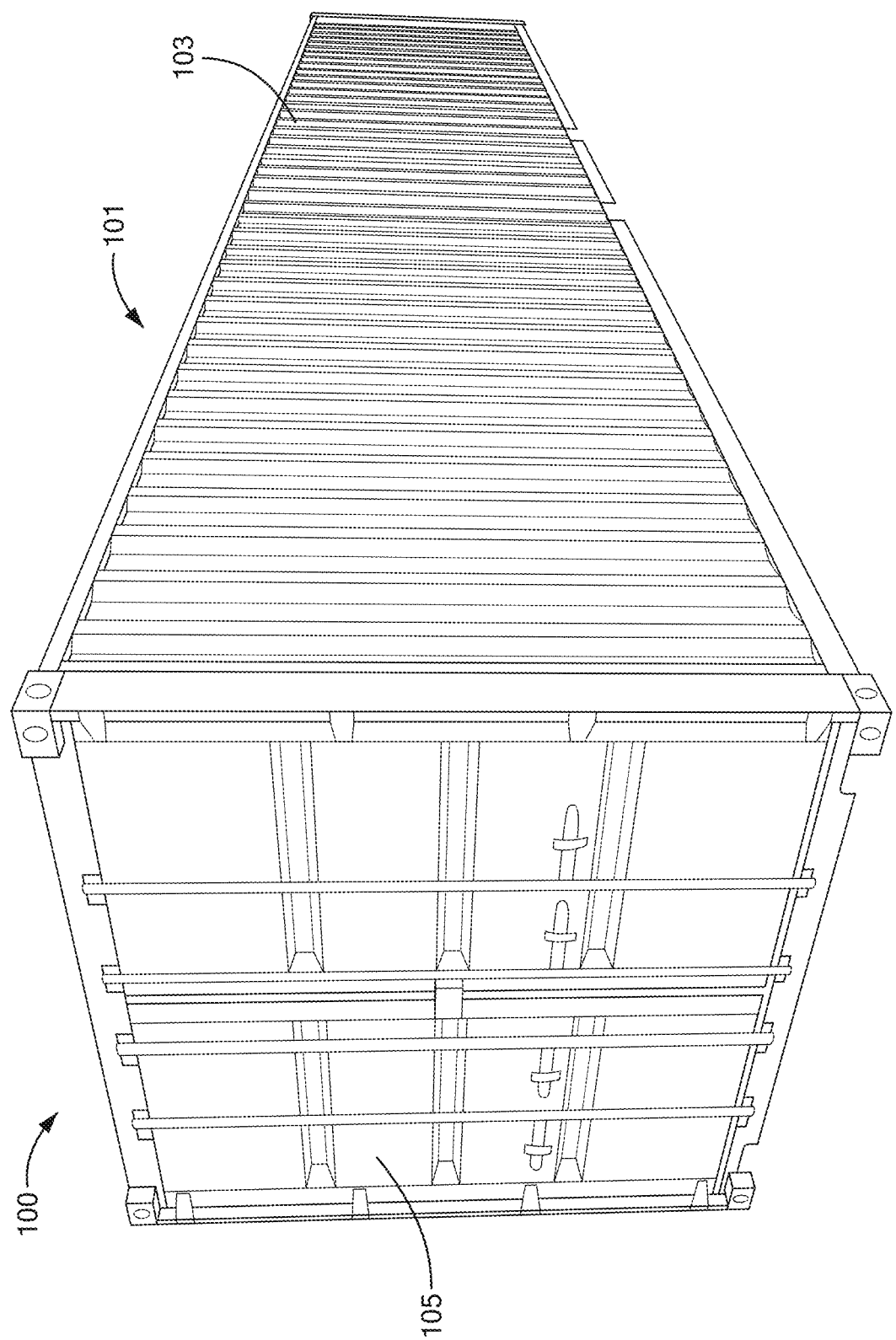
FIG. 1 is a perspective view of a portable seaweed processing plant according to the invention.

Referring to FIG. 1, there is shown a portable seaweed processing plant according to the invention, indicated generally by the reference numeral 100, comprising a shipping container 101 have a rectangular cuboid-shaped body 103 with a releasably securable door 105 at one end thereof.

The shipping container 101 is configured to be transported on the rear of an articulated chassis (not shown) and towed from one location to another, and when at the location may be dismounted from the articulated chassis if suitable lifting equipment is available. Indeed, it is envisaged that a lifting truck, such as a forklift truck, may be transported internal the container or on the rear of the articulated chassis for loading and unloading the portable seaweed processing plant.

Internal the container, there is provided a seaweed processing line (not shown) including a seaweed washing station, a seaweed pre-processing station, a seaweed separation 10 station, and a seaweed packing station. The processing line is capable of receiving a harvest of fresh seaweed within minutes of the fresh seaweed being brought ashore and processing that seaweed to obtain packaged liquid seaweed product and solid seaweed product.

Figure 2:
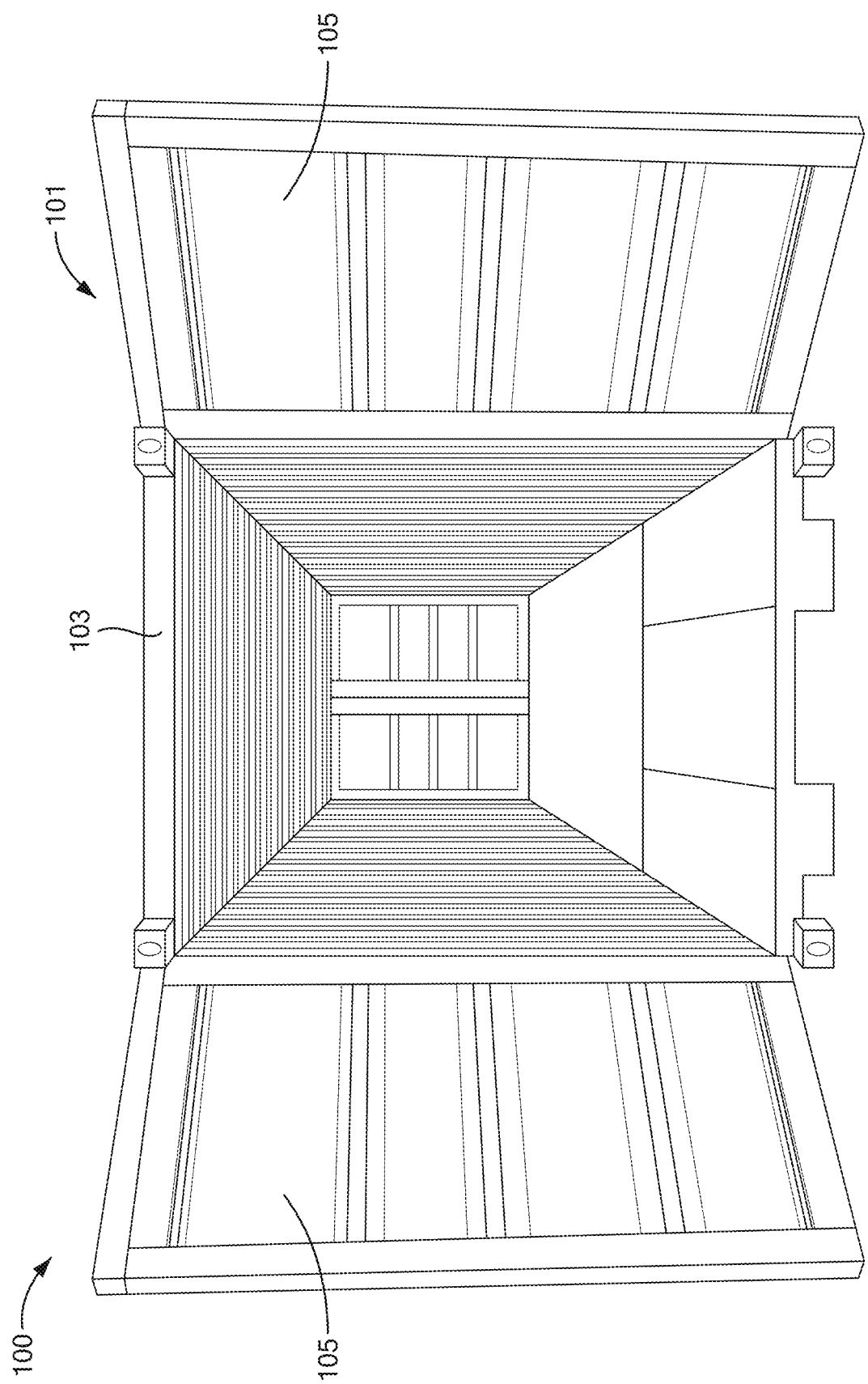
FIG. 2 is a front view of part of the portable seaweed processing plant open at one end.

Referring to FIG. 2, there is shown a front view of the shipping container 101 of the portable seaweed processing plant, with the seaweed processing line equipment removed from the interior of the shipping container. It can be seen that when the door 105 is open, it provides access to the interior of the shipping container 101 which provides a suitably contained and sheltered structure for the processing of the seaweed.

Figure 3:
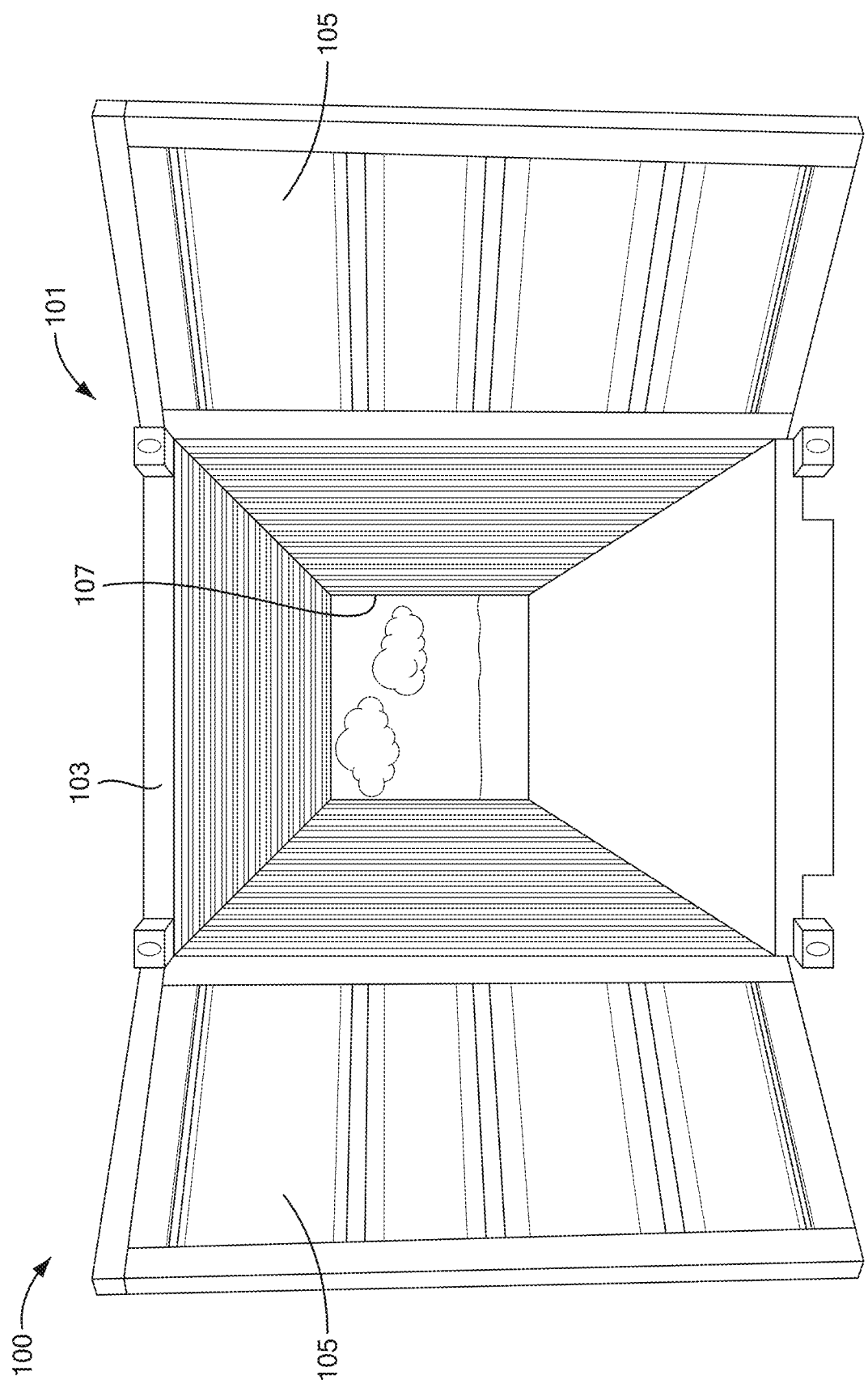
FIG. 3 is a front view of part of the portable seaweed processing plant open at both ends.

Referring to FIG. 3, there is shown a front view of the shipping container 101 of the portable seaweed processing plant similar to FIG. 2, with the seaweed processing line equipment removed from the interior of the shipping container 101. In FIG. 3, there is a another, second door (not shown) in an opening 107 at the other end of the shipping container 101 and that second door has also been opened, showing how, if desired, both ends of the shipping container 101 could be opened and the process may flow through the entire shipping container from one end to the other. Freshly harvested seaweed may be brought into one end of the shipping container before being washed in the washing station (not shown), before travelling through the shipping container and passing through all the stages of the seaweed processing line, namely the preprocessing station, the separation station and the packing station, in turn. Once packaged, the seaweed exits from the other end of the container.

In addition to the foregoing, it will be understood that tracks or rails may be provided and one or more of the stations may be mounted on rails so that when the doors are opened, this may allow for the tracks or rails to be deployed external the shipping container and for one or more of the stations to be rolled along the track to a position, still on the rails/tracks, but external the shipping container. In this way, this will provide more spaced internal the shipping container and greater separation between the different stages of the processing line which may be advantageous depending on the size of the harvested crop and the processing parameters (e.g. if one stage is likely to produce heat or moisture in the form of liquid or steam, it may be preferable to separate that part of the process lines from other parts of the process lines where those conditions may be unhelpful.

In addition, the tracks or rails may allow the components to be stored more compactly internal the container during transit or post-processing. It is envisaged that the stations could be mounted on rails internal the shipping container and when not processing seaweed, such as when shipping to another location, one or more stations may be moved along the rails towards one or more of the other stations to compactly store all the components towards one end of the shipping container. This will allow for the space freed up by the movement of the station to be used for storage of product, a lifting machine, a generator or other equipment.

Figure 4:
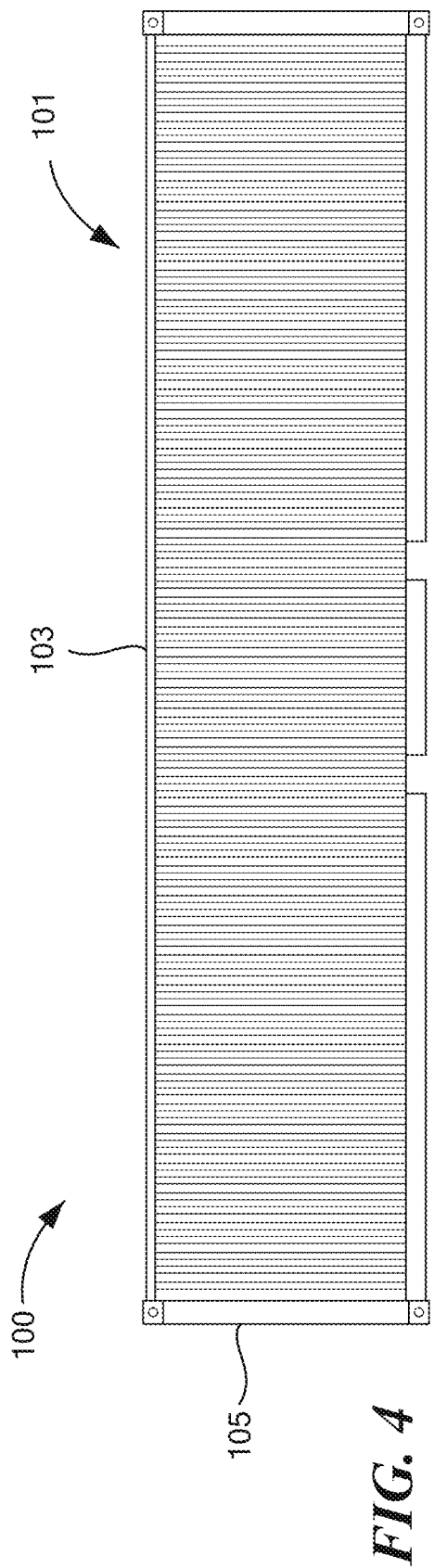
FIG. 4 is a side view of a portable seaweed processing plant.
Figure 5:
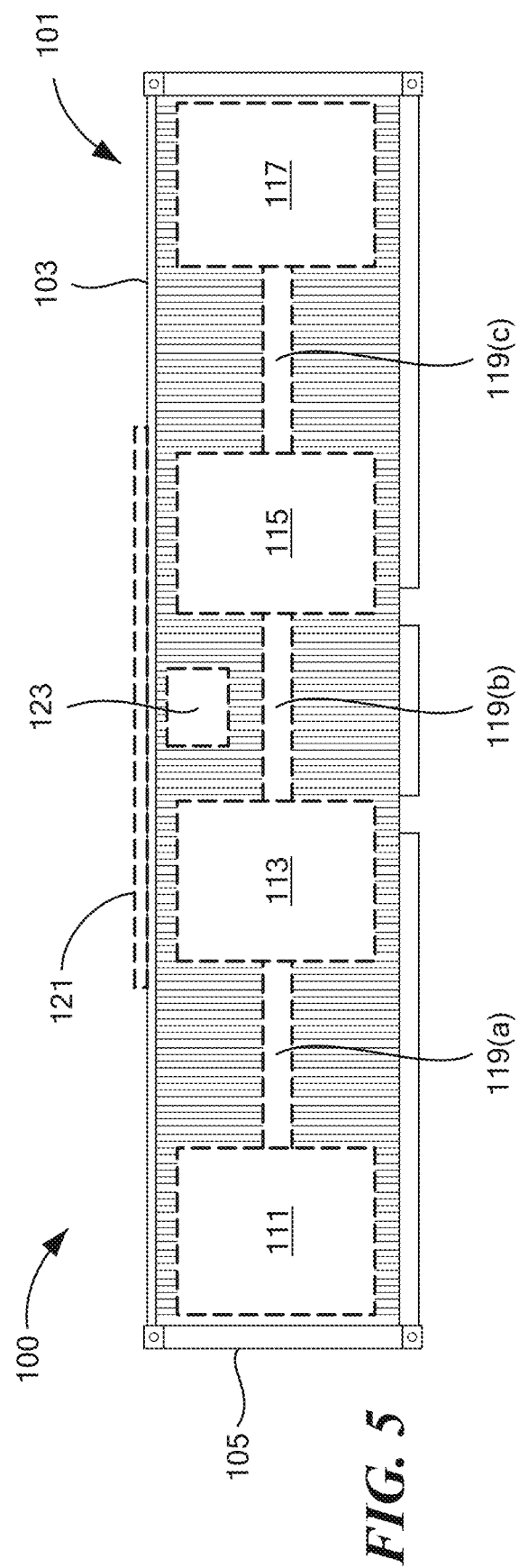
FIG. 5 is a view similar to FIG. 4 with the components of the portable seaweed processing plant shown in outline.

Referring now to FIGS. 4 and 5, there is shown a pair of side views of the shipping container 101 that forms part of the portable seaweed processing plant according to the invention. FIG. 4 is a simple side view with the pair of doors closed. The container is a standard-sized 40 foot shipping container commonly used in the shipping industry however it is envisaged that a 20 foot shipping container may also be used to good effect.

Referring specifically to FIG. 5, there is shown a side view of the portable seaweed processing plant similar to FIG. 4 but with the components of the portable seaweed processing plant and the seaweed processing line 109 shown in dashed outline as they are located internal, and in some cases external, the shipping container 101. The seaweed processing line 109 includes a seaweed washing station 111, a seaweed preprocessing station 113, a seaweed separation station 115 to separate the seaweed into liquid seaweed and solid seaweed, and a seaweed packing station 117 to pack the liquid seaweed and the solid seaweed for onward transport. The stations 111, 113, 115, 117 are shown joined together in a processing line by conveyors 119(a), 119(b) and 119(c).

A power supply is provided by way of a solar panel array 121 mounted on the roof of the body 103 of the shipping container 101. Preferably, the solar panel array 121 may be mounted on a frame (not shown) to allow the solar panel array to be directed towards the incident rays from the sun to provide a more efficient solar panel array output. Instead of or in addition to the solar panel array, a wind turbine (not shown) may be provided that could, if desired, be mounted on the roof of the container 101. It is envisaged that the wind turbine may pivot to and from an upright operation position and a substantially horizontal storage position lying along the roof of the container. In this way, the wind turbine will be protected and only deployed when required by pivoting the wind turbine to its upright position. A backup generator 123 is provided if there is a shortfall in power generated by either of the renewable energy supplies (wind turbine and solar array). Remote monitoring equipment (not shown), communication equipment (not shown) and/or a memory (not shown) may also be provided for collecting one or more of seaweed conditions, process parameters and/or environmental conditions in the shipping container and conveying that data to an individual responsible for monitoring the process and the quality of the product.

In addition to the foregoing, a water tank may be provided in the container for storage of water for washing the seaweed in the seaweed washing station 111. The washing station is provided to remove sand, crustaceans and other detritus from the seaweed before it is passed onwards for further processing. The water tank may be provided with a filtration system so that the water may be recycled and any materials removed from the seaweed can be removed from the water and disposed of in an environmentally friendly manner.

The seaweed washing station 111 comprises one or more of: (i) an immersion bath; (ii) at least one spray nozzle; (iii) a sprinkler; (iv) a hand-operated hose; (v) a conveyor; and (vi) a centrifuge. Indeed, the seaweed washing station may comprise a plurality of these stations. The specific choice may depend in part on at least one or more of the type of seaweed, the level of pollution (if appropriate) on the seaweed, the season, and the amount of material on the seaweed. Therefore, a number of the options may be provided as part of the seaweed washing station and the appropriate seaweed washing option chosen depending on the raw material. Once washed, the seaweed is passed along conveyor 119(a) to the seaweed pre-processing station 113.

The seaweed pre-processing station 113 comprises one or more of: (i) a sonication device; (ii) a bead beater; (iii) a cavitation unit; and (iv) an autoclave. Again, the seaweed pre-processing station may comprise a plurality of these components (or indeed other components suitable to achieve the desired result) as the specific choice of component may depend in part on at least one or more of the type of seaweed, the consistency of the seaweed, and the season. For example, more rugged types of seaweed, and/or more mature crops of seaweed, may require more aggressive pre-processing techniques in the pre-processing station 113 in order to achieve the desired effect, which is to break down the cellular structure of the seaweed and release the nutrients into a liquid form. Indeed, in some cases, it will be desirable to pass the seaweed through two or more of the components in the pre-processing station 113. A number of the components may be provided as part of the seaweed pre-processing station 113 and the appropriate washing option(s) chosen depending on the raw material. Once pre-processed, the seaweed is passed along conveyor 119(b) to the seaweed separation station 115.

The seaweed separation station 115 a vat (not shown) or other suitable receptacle having one or more of: (i) a mixer; (ii) a heat source; and (iii) a chopper therein for agitating the seaweed and separating the liquid seaweed from the solid seaweed. This part of the process, namely the separation and retrieval of the liquid seaweed from the solid seaweed, is a fundamental component of the present invention. By separating the seaweed in this way, it is possible to subsequently package the liquid seaweed, with the many nutrients and advantageous features thereof in a concentrated format, and sell that liquid seaweed as a relatively high-value commodity in industries such as food processing, cosmetics, pharmaceuticals and the like. The solid seaweed, having less nutrients and less minerals, or at least having the same amount of nutrients and minerals but in a less concentrated form, may be sold separately as a different (lower value) product into industries such as food processing, animal feed and fertilizer. In this way, the financial return from the harvest is optimized as well as obtaining a greater yield of product from the harvest. Again, the type of treatment applied to the seaweed in the seaweed separation station may differ depending on the type of seaweed, the consistency of the seaweed, and the season. Once separated, the liquid seaweed and the solid seaweed are passed along conveyor 119(c) to the seaweed packing station 117.

Once the liquid seaweed and the solid seaweed reach the seaweed packing station 117, they are packed separately for onward transport to customers, for further processing into food products, animal feed, pharmaceuticals, cosmetics or the like. The packaged seaweed may be shipped directly, immediately after processing in the portable seaweed processing plant, in another transport vehicle (not shown), or the packaged seaweed may be stored in the shipping container 101 until a critical mass of product has been harvested and it is financially worthwhile to ship the consignment of goods to a customer.

It will be understood that various modifications could be made to the portable seaweed processing plant 100 described herein without departing from the invention. For example, a drying station may be provided to dry out the solid seaweed. The drying station could be located intermediate the seaweed separation station 115 and the seaweed packing station 117. In addition, a press may be provided as part of or separate to the vat and other equipment in the seaweed separation station 115. The press would effectively squeeze the seaweed to release moisture from the seaweed. Indeed, a press could be part of the seaweed pre-processing station 113.

In addition to the foregoing, it is envisaged that the portable seaweed processing plant 100 may further comprise a temperature control unit for controlling the internal temperature in the shipping container 101. The temperature control unit may be operable to heat and/or cool the interior of the shipping container. It is envisaged that it is preferable to not allow the temperature of the seaweed exceed 36° C. Therefore, the internal temperature may be monitored to keep the temperature to an acceptable level. Furthermore, this may be useful to provide a more comfortable working environment internal the portable seaweed processing plant, allowing the portable seaweed processing plant to be used in a number of different climates, locations and seasons.

The present invention also relates to a new method of processing seaweed. The method entails using the apparatus described above to process the seaweed on location, closely adjacent to where the seaweed is landed. In this way, the seaweed will be fresh when it is being processed and the yield from the harvest will be increased, with additional relatively high-value products being obtained from the harvest.

In this specification the terms "comprise, comprised, comprises and comprising" and the terms "include, includes, included and including" are all deemed totally interchangeable and should be afforded the widest possible interpretation.

The invention is not limited to the embodiment hereinbefore described but may be varied in both construction and detail within the scope of the appended claims.

What is claimed:

1. A portable seaweed processing plant comprising a shipping container having a body with at least one releasably securable door to provide access to and from an interior of the shipping container, the shipping container being configured for transport on an articulated chassis; the shipping container having housed therein a seaweed processing line including: a seaweed washing station; a seaweed pre-processing station; a seaweed separation station to separate seaweed into liquid seaweed and solid seaweed; and a seaweed packing station to pack the liquid seaweed and the solid seaweed for onward transport.

2. The portable seaweed processing plant as claimed in claim 1 in which there is provided a water tank housed in the shipping container for use by the seaweed washing station.

3. The portable seaweed processing plant as claimed in claim 2 in which there is provided a filtration system intermediate the water tank and the seaweed washing station for filtration of water used in the seaweed washing station.

4. The portable seaweed processing plant as claimed in claim 1 in which the seaweed washing station comprises one or more of: (i) an immersion bath; (ii) at least one spray nozzle; (iii) a sprinkler; (iv) a hand-operated hose; (v) a conveyor; and (vi) a centrifuge.

5. The portable seaweed processing plant as claimed in claim 1 in which the seaweed pre-processing station comprises one or more of: (i) a sonication device; (ii) a bead beater; (iii) a cavitation unit; and (iv) an autoclave.

6. The portable seaweed processing plant as claimed in claim 1 in which the seaweed separation station comprises a vat having one or more of: (i) a mixer; (ii) a heat source; and (iii) a chopper.

7. The portable seaweed processing plant as claimed in claim 1 in which the seaweed processing line comprises a drying station for drying the solid seaweed.

8. The portable seaweed processing plant as claimed in claim 7 in which the drying station is located downstream of the seaweed separation station and upstream of the seaweed packing station.

9. The portable seaweed processing plant as claimed in claim 1 in which the shipping container is provided with a conveyor intermediate; the seaweed washing station and the seaweed pre-processing station; the seaweed pre-processing station and the seaweed separation station; and the seaweed separation station and the seaweed packing station.

10. The portable seaweed processing plant as claimed in claim 1 in which the shipping container is provided with a dedicated power supply.

11. The portable seaweed processing plant as claimed in claim 10 in which the dedicated power supply is powered by a renewable energy source.

12. The portable seaweed processing plant as claimed in claim 10 in which the dedicated power supply comprises a generator.

13. The portable seaweed processing plant as claimed in claim 1 in which the shipping container is provided with a temperature control unit.

14. The portable seaweed processing plant as claimed in claim 13 in which the temperature control unit comprises a thermostat, and the temperature control unit is operable to maintain a temperature inside the shipping container at or below 36° C.

15. The portable seaweed processing plant as claimed in claim 1 in which the shipping container is provided with a releasably securable door at either end of the body.

16. The portable seaweed processing plant as claimed in claim 1 in which the shipping container is provided with a plurality of tracks and in which one or more of the seaweed washing station, the seaweed pre-processing station, the seaweed separation station and the seaweed packing station is slidably mounted on at least one of the plurality of tracks for reciprocal movement along at least one of the plurality of tracks.

17. The portable seaweed processing plant as claimed in claim 16 in which at least one of the plurality of tracks is extensible and may be extended outwardly from the shipping container through an open releasably securable door.

18. The portable seaweed processing plant as claimed in claim 1 in which the seaweed separation station comprises a press.

19. The portable seaweed processing plant as claimed in claim 1 in which there is provided two or more of: (i) one or more sensors measuring one or more of seaweed conditions, process parameters and/or environmental conditions in the shipping container; (ii) a communication module for relaying sensor data to a remote monitoring station; and (iii) a memory for storage of sensor data.

20. The method of processing seaweed comprising processing seaweed in the portable seaweed processing plant as claimed in claim 1.

* * * * *